United States Patent
Sargent et al.

(10) Patent No.: US 10,586,103 B2
(45) Date of Patent: Mar. 10, 2020

(54) TOPOGRAPHIC DATA MACHINE LEARNING METHOD AND SYSTEM

(71) Applicant: Ordnance Survey Limited, Southampton, Hampshire (GB)

(72) Inventors: Isabel Sargent, Southampton Hampshire (GB); Jonathon Hare, Southampton Hampshire (GB)

(73) Assignee: Ordnance Survey Limited, Southampton, Hampshire (GB)

(*) Notice: Subject to any disclaimer, the term of this patent is extended or adjusted under 35 U.S.C. 154(b) by 105 days.

(21) Appl. No.: 15/888,424

(22) Filed: Feb. 5, 2018

(65) Prior Publication Data

US 2018/0225504 A1 Aug. 9, 2018

(30) Foreign Application Priority Data

Feb. 8, 2017 (GB) .................................. 1702095.9

(51) Int. Cl.
*G06K 9/00* (2006.01)
*G06K 9/62* (2006.01)
(Continued)

(52) U.S. Cl.
CPC ......... *G06K 9/0063* (2013.01); *G06K 9/6218* (2013.01); *G06K 9/6256* (2013.01);
(Continued)

(58) Field of Classification Search
CPC ........ G01S 17/89; G01S 13/90; G01S 7/4802; G01S 7/4808; G06K 9/00476; G06K 9/52;
(Continued)

(56) References Cited

U.S. PATENT DOCUMENTS 4,827,419 A * 5/1989 Selby, III ............... G01C 21/20
701/528
7,046,841 B1 5/2006 Dow et al.
(Continued)

FOREIGN PATENT DOCUMENTS

WO 2016/198873 A1 12/2016

OTHER PUBLICATIONS

Jun. 26, 2018—(EP) Extended Search Report—Application No. 18154908.0.
Ghosh, Soumya et al., "Automatic Annotation of Planetary Surfaces With Geomorphic Labels," IEEE Transactions on Geoscience and Remote Sensing, vol. 48, No. 1, Jan. 2010.
Hohle, Joachim, "From Classification Results to Topographic Maps," Aalborg University, Department of Development and Planning, Demark, Sep. 16, 2016.
(Continued)

*Primary Examiner* — Aklilu K Woldemariam
(74) *Attorney, Agent, or Firm* — Banner & Witcoff, Ltd.

(57) ABSTRACT

Aspects described herein apply machine learning techniques for image recognition and classification to the processing of topographic imagery, in order to permit more accurate and detailed topographic representations of an area to be obtained. In particular, in one embodiment a machine learning system is trained with existing topographic imagery and corresponding topographic data relating to a particular area, so that the machine learning system is then able to relate actual physical topographical features to their topographic representations in existing data. Having been so trained, the machine learning system may then be used to process topographic imagery data of the same area to determine new topographic details thereof for incorporation into the topographic data.

23 Claims, 6 Drawing Sheets

(51) Int. Cl.
*G06K 9/72* (2006.01)
*G06N 3/08* (2006.01)
*G06N 3/04* (2006.01)

(52) U.S. Cl.
CPC ......... *G06K 9/6273* (2013.01); *G06K 9/6282* (2013.01); *G06K 9/726* (2013.01); *G06N 3/08* (2013.01); *G06N 3/0454* (2013.01)

(58) Field of Classification Search
CPC .............. G06K 9/6201; G06K 9/6267; G06K 9/00201; G06K 9/0063; G06K 9/6269; G06K 9/00979; G06K 9/3241; G06K 9/4628; G06K 9/6218; G06K 9/6222; G06K 9/6253; G06K 9/6256; G06K 9/6273; G06K 9/6282; G06K 9/66; G06K 9/726; G06K 2009/6213; G06K 9/00536; G06K 9/00671; G06K 9/00718; G06K 2209/40; G06K 9/00208; G06K 9/00664; G06K 9/342; G06K 9/6217; G06K 9/6262; G06K 9/72; G06T 11/001; G06T 19/006; G06T 2207/30181; G06T 7/0083; G06T 7/12; G06T 17/00; G01C 11/00; G01C 21/20; G06N 3/0454; G06N 3/08; G06N 3/0409; G06N 3/0445; G06N 3/084; G06N 3/02; A61B 5/0064; A61B 5/1071; A61B 5/1075; A61B 5/1114; A61B 5/1116; A61B 5/486; A61B 5/7267; A61B 5/7435; A61B 5/7475; G16H 10/60; G16H 30/40; G16H 50/30; Y04S 10/54; G06F 16/353; G06F 16/583
USPC ....... 382/154, 181, 195, 201, 204, 206, 224; 345/419, 420, 421, 427
See application file for complete search history.

(56) References Cited

U.S. PATENT DOCUMENTS

| | | | |
|---|---|---|---|
| 7,246,040 B2* | 7/2007 | Borg | G01C 11/00 |
| | | | 702/188 |
| 9,576,373 B2 | 2/2017 | Shorter et al. | |
| 10,255,628 B2* | 4/2019 | Li | G06Q 30/0631 |
| 10,317,240 B1* | 6/2019 | Di Pietro | G01C 21/3694 |
| 2011/0267369 A1* | 11/2011 | Olsen | G01C 21/3647 |
| | | | 345/634 |
| 2015/0324655 A1* | 11/2015 | Chalasani | G06K 9/6272 |
| | | | 382/103 |
| 2016/0019458 A1* | 1/2016 | Kaufhold | G01S 7/417 |
| | | | 342/25 F |
| 2016/0055237 A1* | 2/2016 | Tuzel | G06F 16/353 |
| | | | 382/224 |
| 2016/0378861 A1* | 12/2016 | Eledath | G06K 9/00718 |
| | | | 707/766 |
| 2017/0094530 A1* | 3/2017 | Ross | B64C 39/024 |
| 2017/0220887 A1* | 8/2017 | Fathi | G06K 9/00201 |
| 2017/0236287 A1* | 8/2017 | Shen | G06K 9/6269 |
| | | | 382/206 |
| 2017/0308770 A1* | 10/2017 | Jetley | G06K 9/4671 |

OTHER PUBLICATIONS

Murphy, Kevin P., "Machine Learning—A Probabilistic Perspective," MIT Press, Cambridge, MA, Jan. 1, 2012, p. 2.
Ras, Zbigniew and Agnieszka Dardzinska, "Advances in Data Management," Springer Science & Business Media, Oct. 27, 2009, pp. 81-83.
Skillicorn, David "Knowledg Discovery for Counterterrorism and Law Enforcement," CRC Press, Nov. 13, 2008, p. 127.
Aug. 7, 2017 GB Search Report—App 1702095.9.

* cited by examiner

TOPOGRAPHIC DATA MACHINE LEARNING METHOD AND SYSTEM

CROSS-REFERENCE TO RELATED APPLICATIONS

This application claims priority to United Kingdom application no. 1702095.9, filed Feb. 8, 2017, having the same title, herein incorporated by reference in its entirety for all purposes.

TECHNICAL FIELD

Aspects described herein relate to a method and system that use machine learning techniques to process topographic imagery in order to determine topographic features and properties of an area.

BACKGROUND

Artificial intelligence and machine learning techniques such as neural networks and rule-based expert systems have been known in the art for many years, and are applied in many different fields. In particular, in the field of machine vision and image processing a particular type of neural network known as a convolutional neural network (CNN) is often used, and such networks achieve fast and accurate results in image recognition and classification systems (see e.g. http://en.wikipedia.org/wiki/Convolutional_neural_network for a review of the state of the art), and it has been reported (ibid.) that the performance of convolutional neural networks is now close to that of humans, although they still struggle with identifying objects that are small and thin. However CNNs can be capable of outperforming humans in classifying images of objects into fine-grained categories, for example images of different breeds of dog or bird.

SUMMARY

Aspects described herein apply machine learning techniques for image recognition and classification to the processing of topographic imagery, in order to permit more accurate and detailed topographic and cartographic representations of an area to be obtained. For example, four different machine intelligence implemented functions can be envisaged: change detection, geographic transfer, discovery, and inference. In particular, in one aspect a machine learning system is trained with existing topographic imagery and corresponding topographic data relating to a particular area, so that the machine learning system is then able to relate actual physical topographical features to their topographic representations in existing map data. In particular, the machine learning system may be trained to a high topographic resolution, using topographic imagery within which almost every pixel has been semantically labelled with what it is topographically. Having been so trained, the machine learning system may then be used to process new topographic imagery data of the same area to determine new topographic details thereof. As a consequence, changes in topography can be identified. Alternatively, the trained machine learning system may be input topographic imagery data of a different geographic area, and then recognise and generate new topographic map data corresponding to the new area. That is, the trained machine learning system may be able to update existing mapping data relating to the area which was used as its training data, or may be able to generate automatically entirely new sets of mapping data e.g. new map images of different geographic areas. With respect to this second use, the ability to generate automatically detailed topographic data (i.e., maps) of areas that may have only been lightly mapped in the past simply from topographic imagery of the area should prove very useful.

In a third technique, in some aspects the trained machine learning system may be input topographic imagery, and analyse the imagery to discover new information about the topography. For example, the topographic imagery may be analysed so as to provide more detailed semantic labels for already identified features, or alternatively to accumulate plural objects having some feature(s) in common into a common category, which may then be aggregately semantically labelled with a common label. Moreover, in a fourth technique, the trained machine learning system may be able to classify topographic objects by inference. For example, having some a priori knowledge of what a topographic feature actually is, and then looking for other similar topographic features representing other instances.

In view of the above, one aspect provides a method for generating a machine learning system for topographic analysis of imagery of a geographic area. The method comprises providing an untrained machine learning system implemented on a computer system, into which is input a plurality of images of a first geographic area in the machine learning system for use as training images, and topographic data relating to the first geographic area and having known topographic semantic labelling for use as topographic training data. The machine learning system is then trained with the plurality of images and the topographic data of the first geographic area such that it associates topographical features in the input images of the first geographic area with the corresponding topographic semantic label specified by the input topographic data of the first geographic area. The result of such training is a trained machine learning system that should be able to recognise topographic features within input imagery, and then semantically label them with the same topographic semantic label as was used for such features in the set of topographic data that was used as training data for the system.

In one aspect the machine learning system is a convolutional neural network. Such neural networks have been shown to be better than humans at recognising images.

The input images may be aerial or satellite images of the first geographic area, or may be point cloud data sets, for example obtained from non-optical sensors such as LIDARs or Radars. More generally, any remote sensed data sets that can be used for topographic data determination may be used. Such data sets or images are now relatively inexpensive to obtain and refreshed imagery or data sets can be repeatedly obtained over time in order to maintain an up to date topographic database.

In some aspects the topographic semantic labelling comprises a set of cartographic symbols and textual labels. In particular, the cartographic symbols and labels may be in accordance with a pre-existing cartographic symbol and labelling convention, such that new cartographic maps can be produced that are in accordance with existing mapping symbol and labelling conventions.

Another aspect may provide a method for processing images of a geographic area to identify topographic features therein, the method comprising receiving images of a geographic area and inputting the images into a topographically trained machine learning system. The machine learning system then recognises topographic features within the images and semantically labels the recognised features according to a pre-defined semantic labelling convention.

Topographic data corresponding to the recognised features and having the semantic labels can then be generated for storage in a topographic database relating to the geographic area. With such an arrangement then new topographic data can be obtained automatically by the trained machine learning system from images of the geographic area.

According to an aspect the received images are of the same geographic area that the topographically trained machine learning system was trained upon, wherein the recognised topographic features include new features within the geographic area that have arisen since the machine learning system was trained. This allows a topographic database relating to the geographic area to be easily kept up to date over time.

According to another aspect the received images are of a different geographic area than the images on which the topographically trained machine learning system was trained, whereby topographic data relating to a different geographic area is obtained. This allows topographic data to be readily generated for new areas, which may have been otherwise only lightly mapped. In some aspects the newly generated topographic data is semantically labelled using the same pre-defined semantic labelling convention as the topographic data on which the machine learning system was trained. This ensures that consistency with existing topographical data relating to other geographic areas is maintained.

According to an aspect cartographic images may be generated from the newly-generated topographic data. Hence, new map images of the geographic areas can be readily obtained. The map images may be up to date map images of areas that were already mapped, or completely new map images of areas that previously had not been mapped, or had been only lightly mapped previously.

According to an aspect described herein, where new cartographic images have been generated, the generated cartographic images may be output to a user. For example, the outputting to a user may comprise one or more of displaying the cartographic images on a display; or printing the cartographic images via a printer.

Further features will be apparent from the below description and the appended claims.

BRIEF DESCRIPTION OF THE DRAWINGS

Aspects will now be further described by way of example only and with reference to the accompanying drawings, wherein like reference numerals refer to like parts, and wherein.

DETAILED DESCRIPTION

Figure 1:
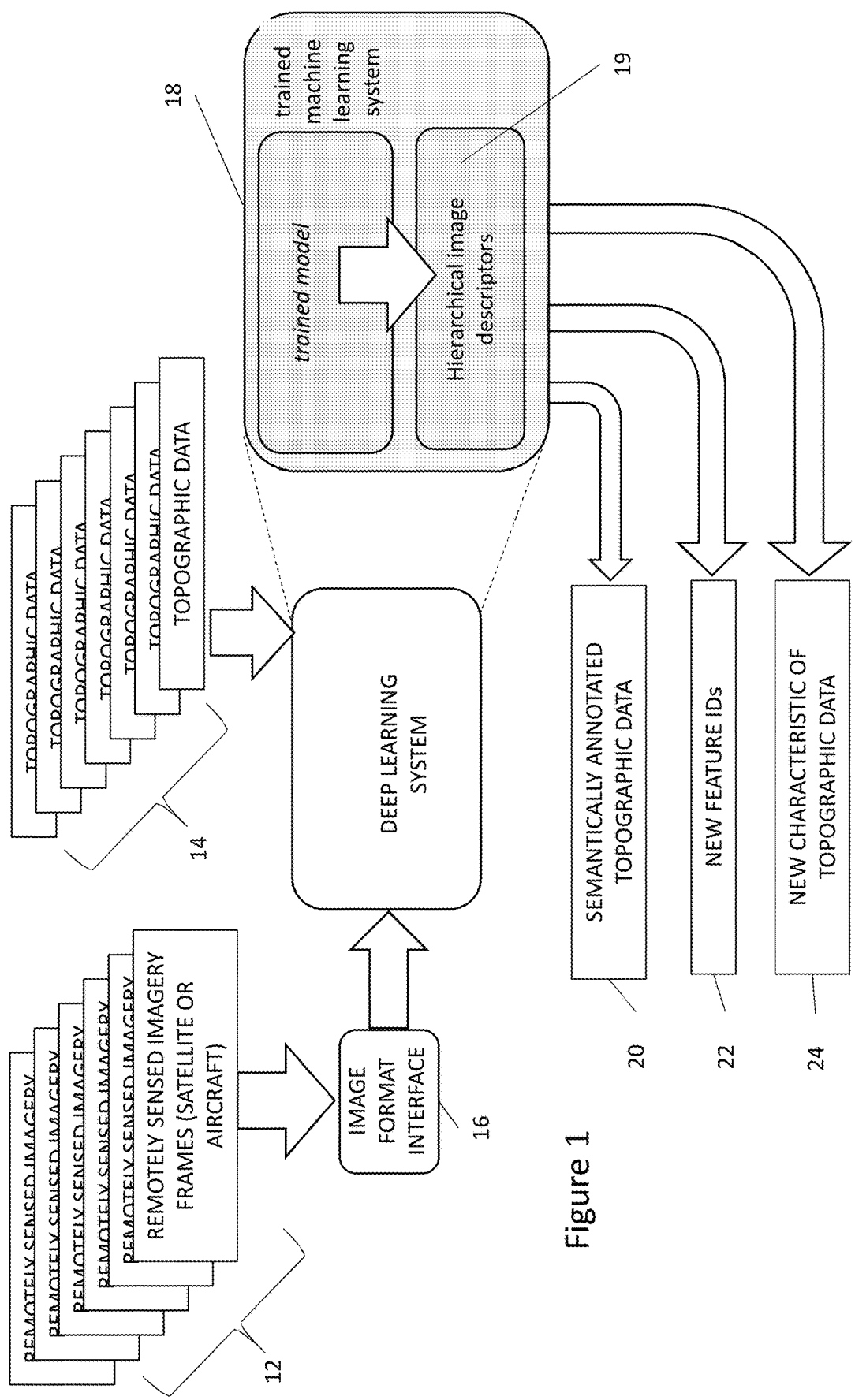
FIG. 1 is a diagram illustrating a first illustrative data flow diagram that may be used according to one or more aspects described herein.

Aspects described herein apply recent advances in machine learning to elicit new understanding about the geographic landscape of an area from image data of the area—specifically we will let the machine learn its own representations from a large data set of images. The underlying premise relating to aspects described herein is that the environmental, economic and social character of a country are encoded in its landscape and that, with expertise, the information held within aerial images can be decoded to extract meaningful features, via a machine learning system, such as a convolutional neural network.

Researchers have built machine learning systems that generate their own layers of representation of imagery. A collaboration between Stanford University and Google in 2012 created a machine that could identify human faces, human bodies and cat faces, without ever being told to look for these things. This is simply because the faces and bodies appeared in so many images (taken from YouTube videos) that the machine created an internal representation of those things.

Image recognition is achieved by developing a 'deep network' using a range of possible algorithms. For example, a Convolutional Neural Network learns representations from images in the form of convolution filters applied to the input images and, at each layer within the network, the convolved derivatives of the input images. Deep networks have layers of adjustable parameters, often called weights (or in the case of CNN, filters or kernals) and these parameters are adjusted using methods of forward- and back-propagation. In the forward phase, the input data are processed by each layer's weights/filters until some outcome is derived. This outcome is then assessed against a cost function (for example, the difference between the outcome and some desired outcome) and the cost is then used to adjust the values of the weights/filters by back-propagating the magnitude of this cost with respect to the location of the parameter in the network.

Aspects described herein apply these machine learning methods, and particularly in some aspects CNN methods, to aerial imagery or other topographic data sets (such as LIDAR generated point clouds), for the purposes of determining new topographic information relating to the landscape shown in the imagery, and for aiding in cartographic production of maps of an area. In one particular aspect they then give the ability to extract characteristics out of geospatial imagery, and in particular information about environmental and societal patterns and its impact on the landscape that have developed over time.

For example, machine based 'deep learning' can be applied to image data to extract the important features of a landscape. For example, example features that might be found might include, e.g., the age of a housing estate, potentially hazardous road sections, or all the organic farms in the country. It also offers the ability to create a step-change in how labels for topographic and geographic features are created and applied, which should lead in turn for new applications and uses of topographic and, geographic data.

Aspects described herein will now be described with reference to FIGS. 1 to 4. Within the following description, training of the machine learning system is first described, followed by four different uses of the trained system: change detection, geographic transfer, discovery, and inference.

i) Machine Learning System

FIG. 1 shows an illustrative system block diagram. Here, plural image frames of remotely sensed images of a landscape 12, obtained, for example, via satellite or aircraft imagery, are fed to a machine learning system, such as deep learning system 18, via an image format interface 16. The image format interface 16 processes the input images to make sure that they are in the correct image format, for example relating to image resolution and size, to be processed by the deep learning system 18. The deep learning system 18 may, as described previously, be a machine learning system, and in particular it is envisaged that according to some aspects it would be a convolutional neural network (CNN), for the reasons described previously that such machine learning systems are particularly good at processing image data. On the basis that the deep learning system 18 can be a convolutional neural network, the details of which for image processing are known in the art, further details of the internal operation of the deep learning system 18 will not be given herein. In order to train the deep learning system 18, existing topographic data 14 is input therein, corresponding to the same geographic area as the remotely sensed image frames. That is, the deep learning system 18 is provided with corresponding existing topographic data relating to the same geographic area as the image data, so that it is then able to relate the input imagery to existing topographic data relating to the same area, and hence train itself to be able to recognise topographic features within the imagery, the topographic features being already semantically labelled within the existing topographic data. In this way, the learning system 18 is able to train itself to recognise within input imagery particular topographic features, and to also semantically label those topographic features with the appropriate topographic label, as already conventionally used in the existing topographic data sets 14.

One advantageous aspect is the high degree of spatial resolution to which the machine learning system can be trained, making use of existing topographic data supplied by, for example, a national mapping agency. In this respect, and taking topographic data held by the UK national mapping agency, Ordnance Survey, as an example, topographic data with a spatial resolution as high as 25 cm is available, which means that each and every 25 cm square of land is topographically categorised and appropriately semantically labelled. By then obtaining image data of at least the same or higher spatial resolution relating to the same area, then each and every pixel of the image can be semantically labelled with the appropriate topographic semantic label for the topographic feature that it represents. Such high spatial resolution, input imagery, fully semantically labelled at a per pixel level, provides an exceptional training corpus on which to train the machine learning system, with the result that the machine learning system should be able to make finer distinctions between different topographic features when put into use once trained.

Figure 2:
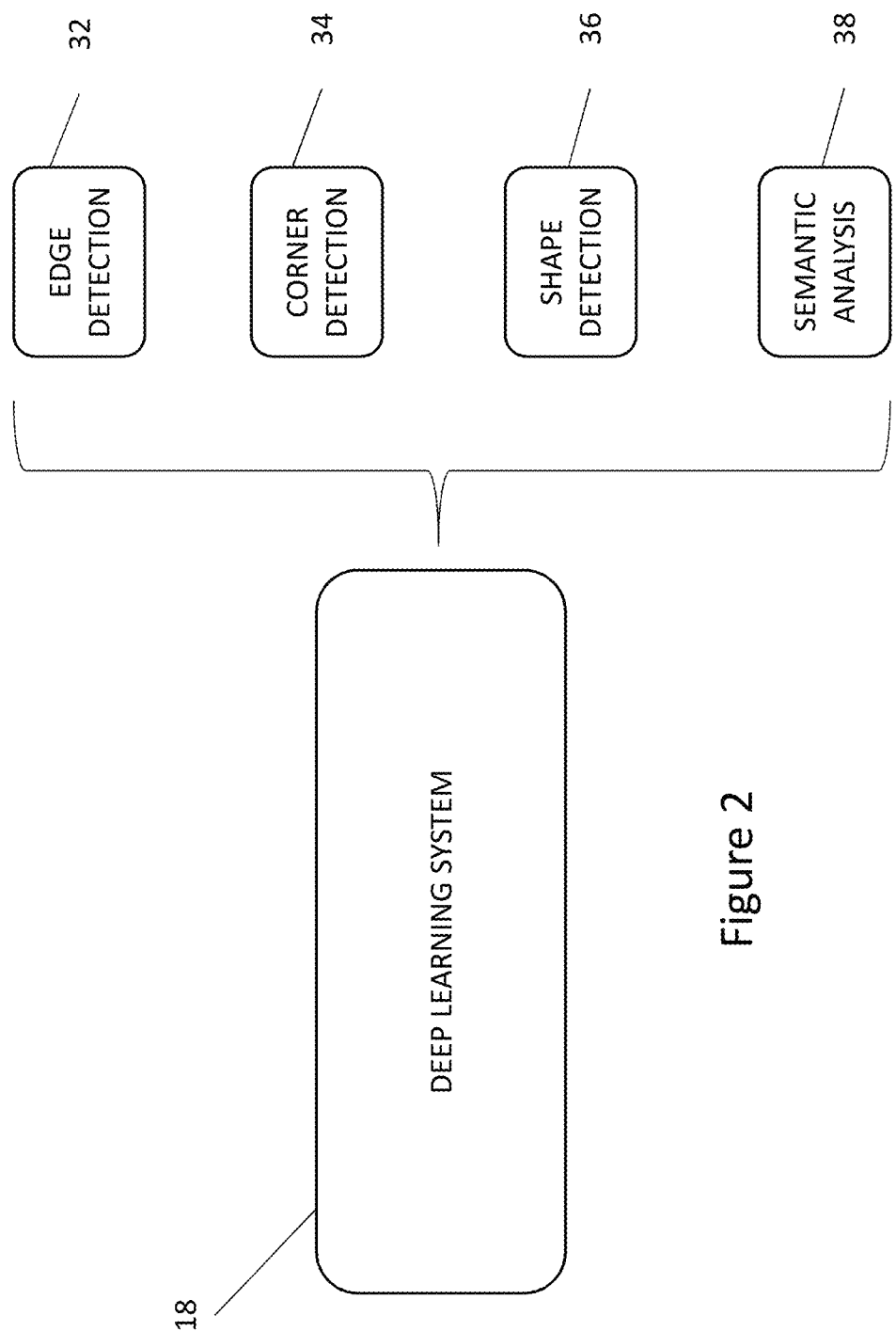
FIG. 2 is a diagram illustrating a deep learning system according to one or more illustrative aspects described herein.

As shown in FIG. 2, the machine learning system 18 develops and "learns" various image processing operators, such as an edge detection algorithm 32, a corner detection algorithm 34, and a shape detection algorithm 36. Such image processing operations are already well known in the art, and can be readily implemented in a machine learning system. In this respect, deep machine learning learns a hierarchical set of descriptors starting with geometric and spectral descriptors, such as edges and primary colours, and ending with semantic descriptors, such as whole objects (e.g. faces or vehicles when trained with hand-held camera imagery). During training, the final level equate to the goal of training, which in the present case is the topographic label against which the algorithm is learning. All the descriptors prior to the final layer may be considered to have been learned in an 'unsupervised' sense in that the machine is not explicitly instructed to find them, rather they are commonly occurring patterns in the data and therefore by 'learning' them the machine has restructured or condensed all the input imagery into meaningful component parts.

Also undertaken by the machine learning system 18 is a degree of semantic analysis, provided by a semantic analysis algorithm 38. At a very basic level, one such semantic analysis algorithm may be to determine the majority colour within an input image, and if it is determined to be mostly green or in the green spectrum range, to then make a determination that the landscape in the input image is that of type "countryside". Alternatively, if the majority colour is a brown or grey colour, or in the brown-grey range of colours, then the learning system 18 may be instructed by the semantic analysis module 38 to consider the input image as relating to a "town" or "cityscape". Such semantic analysis relating to an input image can thereby provide semantic metadata relating to the image contents automatically.

Figure 3:
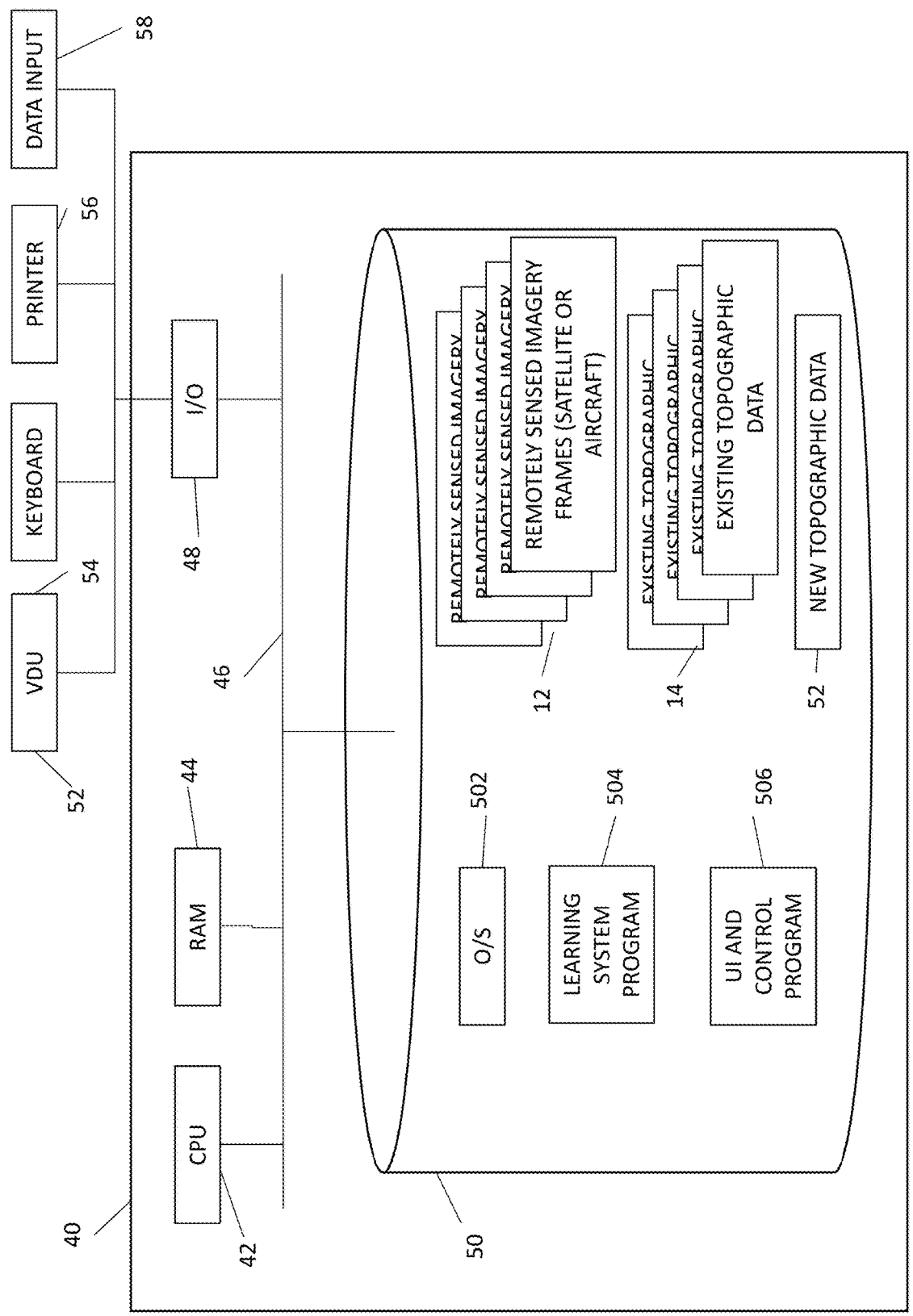
FIG. 3 is system architecture according to one or more illustrative aspects described herein.

The machine learning system 18, once trained with the topographic data and input imagery, may then provide several different forms of output. For example, one form of output is to provide semantically annotated topographic data 20. Another form of output would be to identify new features within the topographic data or image data that has been input and to output metadata relating to these new features as new feature IDs 22. Linked to this, the machine learning system 18 may also determine new characteristics of existing topographic data features, and semantically label the existing topographic data features with the new characteristics, as shown by the new characteristics 24. For example, the topographic data may form a particular image of a built up area, and which may already label semantically the built up area as containing "buildings", but the machine learning system 18, after further analysing the input imagery and the input topographic data, may be able to further semantically differentiate the buildings as "residential buildings" or "commercial buildings". Likewise within these categories new feature identifications may be made so as to further more finely semantically label particular buildings. For example, a "commercial building" could be further semantically labelled as an "industrial" building", or a "retail building", further based on semantic analysis rules developed by the learning system during training. FIG. 3 is an overview system diagram of a computer system 40 which may be used to implement one or more illustrative aspects described herein. Here a computer system 40 is provided, having a central processing unit 42 and a memory unit 44, connected by a common bus 46, and having an input-output (I/O) interface 48. A computer readable storage medium 50, such as a hard disk drive, flash drive, or the like is also provided. The input-output interface allows the computer 40 to interface with a visual display unit 52, a keyboard 54, a printer 56, and a data input port 58, on which data may be input and output. For example, the data input port 58 may be a USB port, or the like.

Stored on the computer readable storage medium 50 is an operating system program 502 that when run by the CPU 42 allows the system to operate. Specific to the present embodiment, also provided is a learning system program 504 which implements the machine learning system 18 when run by the CPU 42. In order to interface with and control the learning system program 504, a user interface and control program 506 is also provided, that controls the computer to provide a visual output to the VDU 52, and to receive user inputs via the keyboard, or a peripheral such as a mouse connected to the data input port 58, in order to control the learning system program 504.

Of course, the machine learning system hardware is not limited to a standalone desktop or server type configuration as described above, and may be implemented on other hardware, and in particular using networked or other distributed computing arrangements that provide greater computing power than stand-alone arrangements.

In terms of the data that the learning system 504 operates on and produces, as described previously with respect to FIG. 1, input data to the learning system program 504 includes remotely sensed imagery frames 12 (obtained, for example, via satellite or aircraft), that comprise image data of a particular geographic area to be processed. In addition, existing topographic data 14 of the same area to which the images 12 relate is also provided. For example, this might be existing cartographic data from existing maps of the particular area. Produced by the learning system program 504, as will be described, is new topographic data 52, which, as described previously, in some aspects might relate to new characteristics of existing topographic data, further semantically annotated topographic data, and new topographic feature IDs. In other aspects, the new topographic data might be completely new topographic data relating to a new area, images for which have been input into the learning system program 504 once it has been trained. Further details of this functionality will be described later.

ii) Training the Machine Learning System

Figure 4:
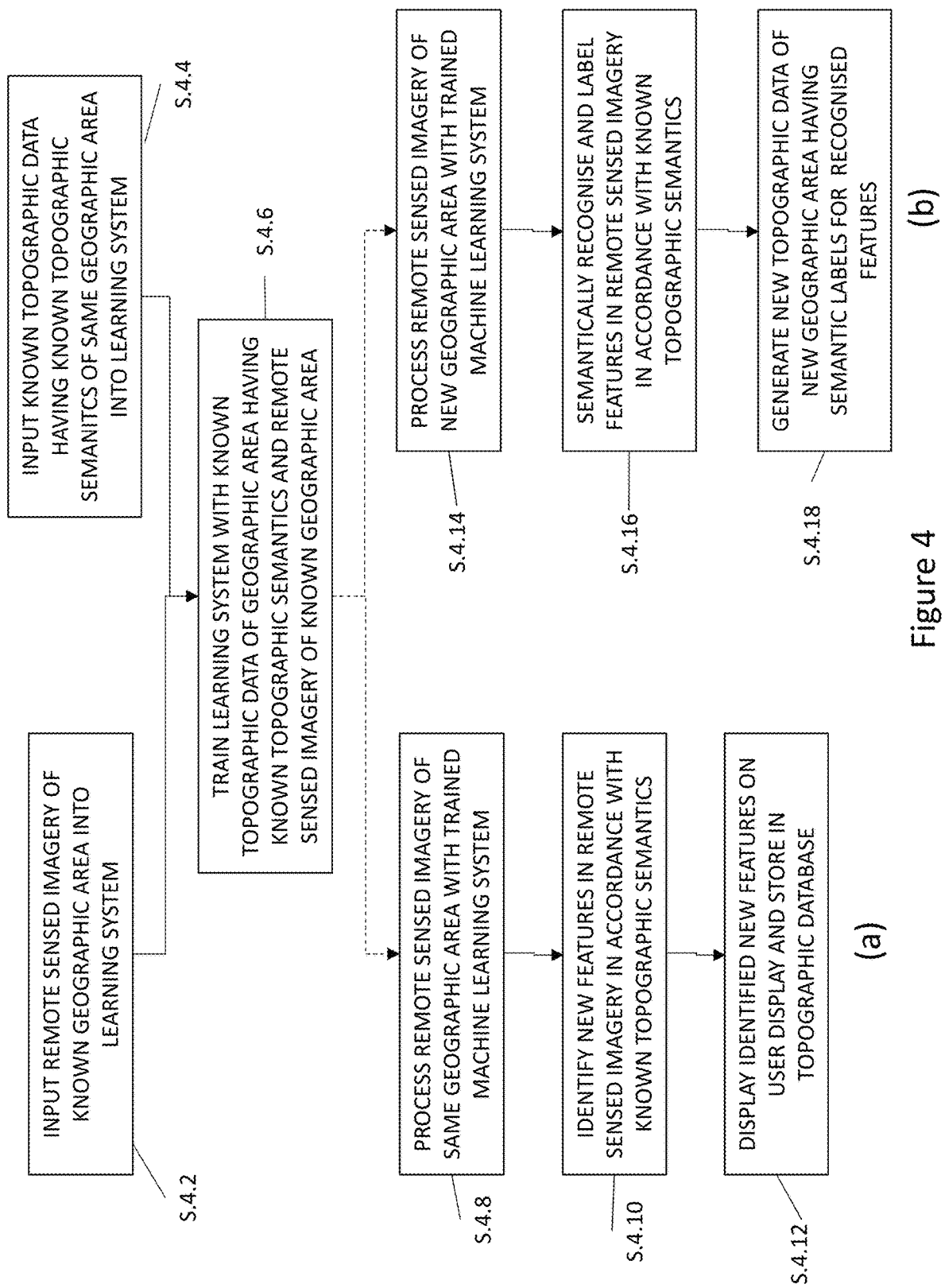
FIG. 4 is a flow diagram illustrating the operation according to one or more illustrative aspects described herein.

Turning now to FIG. 4, the process of training the learning system 18, and then using it to obtain a useful output is shown. In particular, the training steps are shown in steps 4.2 to 4.6, and then two example uses of the training system are also shown in FIG. 4 columns A and B respectively.

Considering the training process first of all, in order to train the system as described previously, remote sensed imagery of a known geographic area is input into the learning system via the image format interface 16, at step 4.2. As discussed previously, the image format interface adjusts the input images to ensure that they are of uniform resolution and size, at appropriate resolution and size for the machine learning system 18. In addition to the remote sensed imagery, known topographic data having known topographic semantics and relating to the same geographic area as the input remote sensed imagery is also input into the learning system, at step 4.4.

Having received the input imagery and known topographic data, the learning system then trains with the known topographic data having the known topographic semantics and the remote sensed imagery of the known geographic area, so as to train itself to recognise particular features within the landscape and be able to semantically label them with the labelling convention of the known topographic data. Thus, for example, within the input imagery there may be an image of a cathedral or castle, for example, and such features will be labelled in the input topographic data with the appropriate semantic label according to the cartographic convention used in the topographic data for a cathedral or a castle. Hence, the learning system will be able to recognise and associate the actual image of a cathedral or castle from above with the semantic label as represented within the topographic data for such. The same recognition and semantic labelling principles apply for the other cartographic features shown within the topographic data to enable the learning system to be trained to recognise as many of the topographic features within the input imagery as possible.

iii) Change Detection in Existing Topographic Data

Once the learning system has been trained, at step 4.6, then two uses of the learning system are possible. A first such use is to input additional remote sensed imagery of the same geographic area into the learning system, and process that imagery with the learning system to detect changes in the topography of the area. This is shown at step 4.8, and described in column A of FIG. 4. For example, new imagery of the same geographic area, obtained some time (perhaps several years) after the original imagery that was used for training the machine learning system (MLS) 18, may be used as new input. The result of such processing will be to identify new features in the new remote sensed imagery in accordance with the known topographic semantics on which the learning system was trained, at step 4.6, and this takes place at step 4.10. The newly identified features may then be displayed to the user on the VDU 52 at step 4.12, and also stored as topographic data 14 in the topographic database. Such a process allows the topographic data of the known already-mapped landscape to be kept up to date, simply by inputting new aerial or satellite imagery of the landscape into the trained learning system. As such, future mapping of the known landscape is made incredibly easy, and the topographic and cartographic data relating to such can be kept up to date, and easily semantically labelled.

iv) Generating Topographic Data of Different Topographic Area

A second use of the trained learning system 18 is shown in column B of FIG. 4, at steps 4.14 to 4.18. What this process does is to allow input imagery of a new, different, geographic area to be input into the learning system 18, at step 4.14. The learning system 18 then processes the imagery of the new geographic area, and semantically recognises and labels features within the remote sensed imagery in accordance with the known topographic semantics, as represented by the set of topographic training data 14. That is, the learning system 18 is able to recognise features within the input imagery using image processing techniques, and then semantically label those features in accordance with the topographic labelling conventions used in the topographic data on which the system was trained. Hence, and to use the same example as previously, if the learning system 18 recognises a cathedral or castle within the input imagery, then the appropriate topographic symbol and semantic label for such from the topographic data can then be used to label that feature. The result of such processing across the whole of the input images is to generate new topographic data of the new geographic area having semantic labels for all of the recognised features, as shown at step 4.18. Effectively, the system is able to generate new maps of the geographic area relating to the input imagery, when no or less detailed maps had been previously available, and using the same topographic symbol conventions as were used in the topographic training data set. In effect, detailed maps of geographic areas that had previously either been only lightly mapped or not mapped at all can be readily obtained relatively automatically, using the trained learning system, and with the further advantage that the maps use the same semantic labelling conventions as the existing topographic data which was used to train the system.

v) Discovery of New Information Relating to Topographic Area

Figure 5:
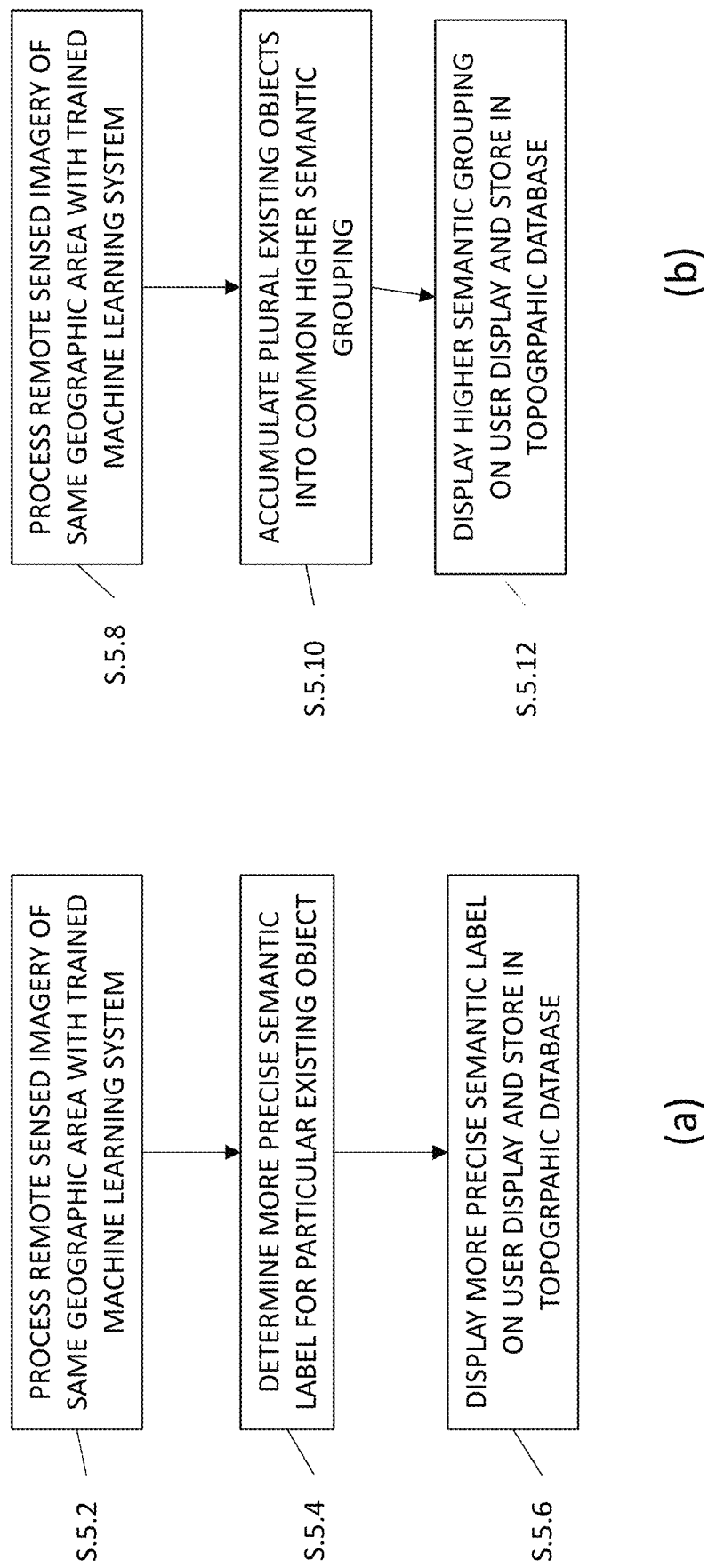
FIG. 5 is a flow diagram illustrating an alternative operation according to one or more illustrative aspects described herein.

Two related further uses of the trained machine learning system is shown in FIGS. 5(*a*) and (*b*), relating to discovering new information relating to an existing topographic area for which imagery and topographic data are already available. In particular, the two further uses shown in FIG. 5 relate to ascribing different levels of semantic labelling to already known topographic objects, such that some new aspect of information about the topographic object can be discovered. For example, as shown in s.5.2 to 5.6, a particular topographic object identified by processing remote sensed imagery of an area in s.5.2, may be given a more precise semantic label by the machine learning system in corresponding topographic data, which better and more accurately characterises the object (s.5.4). For example, an urban area may be divided into residential and industrial buildings, with such a semantic labelling already being present in the topographic data. However, a finer semantic label may be ascribed to the two categories, with the residential buildings being categorised further into houses or apartments, for example. Moreover, the industrial buildings may be categorised further into heavy industrial or light industrial, for example. Even deeper semantic classification may also be possible, for each category, for example by attempting to date the buildings to an era of further define their type, (e.g. 1930's local authority flats, or 1960's housing estate), or further classifying the use of the buildings (e.g. "light industrial warehousing", or "heavy industrial chemical processing", for example). Of course, in order for the machine learning system to be able to identify such categories, then examples of such categories should exist in the machine learning system training data, but once trained machine learning system neural networks continue to evolve to improve such recognition tasks.

Once such more detailed semantic labels have been discovered for topographic objects, they may be displayed to the user on a user display, and also stored in the topographic database, at s.5.6.

A related use is shown in FIG. 5(*b*). Here, instead of discovering further properties of a single topographic object, plural existing objects are grouped together into common groups on the basis of one or more common semantic properties (s.5.10). For example, the machine learning system may process the remote sensed imagery of a topographic area for which corresponding topographic data already exists (and thereby defines existing topographic objects) and identify existing topographic objects which have one or more semantic characteristics in common, and group the objects together. For example, it is common for individual houses on a housing estate that was built at the same time to possess many common features, which common features may be recognised as common on each object to allow the objects to be grouped together into a higher level semantic grouping. Thus, for example, individual "house" objects may be grouped together into a common semantic grouping "housing estate".

Once such higher semantic level groupings have been determined by the machine learning system, they may again be displayed to the user on the user display, and/or stored in the topographic database, at s.5.12.

vi) Inference of New Information Relating to Topographic Area

Figure 6:
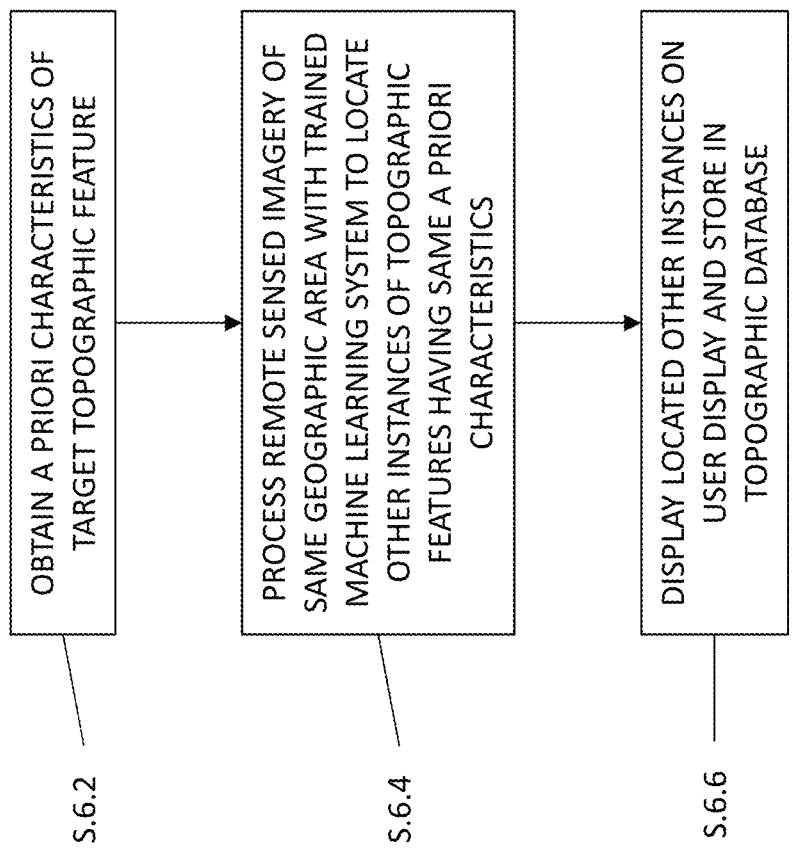
FIG. 6 is a flow diagram illustrating a yet further alternative according to one or more illustrative aspects described herein.

Another use of the topographically trained machine learning system is to use it to infer new information from existing information relating to the topographic area. In particular, the machine learning system may be used to search the imagery of the topographic area to locate other topographic features having the same or similar characteristics to a target topographic feature. FIG. 6 illustrates further details.

As shown in FIG. 6, in this further use the trained machine learning system is provided with information specifying a target topographic feature, for example by a user specifying a target feature using the user interface. The machine learning system that analyses the target topographic feature to determine a priori characteristics thereof, at step. 6.2. For example, the various image processing operations such as edge and corner detection etc may be used to characterise the target feature, as well as higher level semantic labels developed internally within the machine learning system, and which may have no parallel meaning to human users.

The remote sensed imagery is then processed by the machine learning system at s.6.4, to try and locate other topographic features that are the same or similar instances of the target feature. For example, a user might provide the machine learning system with a target image of a tennis court, for example, and the machine learning system then finds other instances of tennis courts in the image data set. Any located instances of topographic features having the same or similar a priori characteristics as the target feature are then identified and displayed to the user, and metadata relating to such stored in the topographic database, at s.6.6.

Various modifications may be made to the above described aspects, to provide further embodiments. For example, in the above examples we refer to the use of remote sensed imagery of the topographic area. It should be understood that by the term imagery we mean it encompass data obtained by any type of remote sensor, such as an optical sensor, or a radar or lidar sensor. As such the remote sensed imagery may be optical images comprising individual pixels, or may be other remote sensed data imagery sets, such as point clouds, or the like.

Various further modifications may be made to the above described aspects whether by way of addition, deletion or substitution to provide further embodiments, any and all of which are intended to be encompassed by the appended claims.

The invention claimed is:

1. A method for generating a machine learning system for topographic analysis of remotely sensed data pertaining to the topography of a geographic area, the method comprising:
   a) providing an untrained machine learning system implemented on a computer system;
   b) inputting remotely sensed data pertaining to the topography of a first geographic area in the machine learning system for use as training data;
   c) inputting topographic data relating to the first geographic area and having known topographic semantic labelling into the machine learning system as topographic training data; and
   d) training the machine learning system with the remotely sensed data and the topographic data of the first geographic area, to recognize the topographical features to be a member of at least a first topographic classification and a second topographic classification arranged in accordance with a semantic topographic hierarchy, wherein the semantic topographic hierarchy is arranged with reference to attributes of the topographic features, the at least first and second topographic classifications specifying a number of attributes a topographic feature must have been determined to possess to be a member of the at least first and second topographic classifications, the first topographic classification higher up the hierarchy requiring fewer attributes than a second topographic classification lower down the hierarchy, and to associate topographical features in the remotely sensed data of the first geographic area with the corresponding topographic semantic label in accordance with the at least first and second topographic classifications specified by the input topographic data of the first geographic area.

2. A method according to claim 1, wherein the machine learning system comprises a convolutional neural network.

3. A method according to claim 1, wherein the remotely sensed data comprises one or more of:

i) input images; and/or ii) point cloud data;

obtained from sensing of the first geographic area.

4. A method according to claim 1, wherein the topographic semantic labelling comprises a set of topographic symbols and textual labels.

5. A method for processing remotely sensed data pertaining to the topography of a geographic area to identify topographic characteristics thereof, the method comprising:

i) receiving remotely sensed data pertaining to the topography of a geographic area;

ii) inputting the remotely sensed data into a trained machine learning system, wherein the trained machine learning system has been topographically trained by:

a) providing an untrained machine learning system implemented on a computer system;

b) inputting remotely sensed data pertaining to the topography of a first geographic area in the machine learning system for use as training data;

c) inputting topographic data relating to the first geographic area and having known topographic semantic labelling into the machine learning system as topographic training data; and d) training the machine learning system with the remotely sensed data and the topographic data of the first geographic area, to recognize the topographical features to be a member of at least a first topographic classification and a second topographic classification arranged in accordance with a semantic topographic hierarchy, wherein the semantic topographic hierarchy is arranged with reference to attributes of the topographic features, the at least first and second topographic classifications specifying a number of attributes a topographic feature must have been determined to possess to be a member of the at least first and second topographic classifications, the first topographic classification higher up the hierarchy requiring fewer attributes than a second topographic classification lower down the hierarchy, and to associate topographical features in the remotely sensed data of the first geographic area with the corresponding topographic semantic label in accordance with the at least first and second topographic classifications specified by the input topographic data of the first geographic area;

iii) recognising, using the machine learning system, topographic features within the data and semantically labelling the recognised features according to a pre-defined semantic labelling convention; and iv) generating topographic data corresponding to the recognised features for storage in a topographic database relating to the geographic area.

6. A method according to claim 5, wherein the received remotely sensed data is of the same geographic area that the trained machine learning system was trained upon, wherein the recognised topographic features include new features within the geographic area that have arisen since the machine learning system was trained.

7. A method according to claim 5, wherein the received remotely sensed data is of a different geographic area than the images on which the trained machine learning system was trained, whereby topographic data relating to a different geographic area is obtained.

8. A method according to claim 7, wherein the generated topographic data is semantically labelled using the same pre-defined semantic labelling convention as the topographic data on which the machine learning system was trained.

9. A method according to claim 5, wherein the recognising further comprises clustering topographic features having the same semantic labels into a common cluster.

10. A method according to claim 5, wherein the recognising further comprises inferring similarities between topographical features having similar attributes, the generated topographical data indicating the similarities indicated by such inferences.

11. A method according to claim 10, wherein the inferring comprises searching the sensed data of the topographic area to locate other topographic features having the same or similar characteristics to a target topographic feature.

12. A method according to claim 5, and further comprising generating cartographic images from the generated topographic data.

13. A method according to claim 12, and further comprising outputting the generated cartographic images to a user, the outputting comprising one or more of:

i) displaying the cartographic images on a display; or ii) printing the cartographic images via a printer.

14. A system for generating a machine learning system for topographic analysis of imagery of a geographic area, the system comprising:

a) one or more processors; and b) at least one computer-readable storage medium, the computer readable storage medium storing one or more computer programs so arranged such that when executed by the one or more processors they cause the one or more processors to generate a machine learning system for topographic analysis of remotely sensed data pertaining to the topography of a geographic area, the generating comprising:

a) providing an untrained machine learning system implemented on a computer system;

b) inputting remotely sensed data pertaining to the topography of a first geographic area in the machine learning system for use as training data;

c) inputting topographic data relating to the first geographic area and having known topographic semantic labelling into the machine learning system as topographic training data; and d) training the machine learning system with the remotely sensed data and the topographic data of the first geographic area, to recognize the topographical features to be a member of at least a first topographic classification and a second topographic classification arranged in accordance with a semantic topographic hierarchy, wherein the semantic topographic hierarchy is arranged with reference to attributes of the topographic features, the at least first and second topographic classifications specifying a number of attributes a topographic feature must have been determined to possess to be a member of the at least first and second topographic classifications, the first topographic classification higher up the hierarchy requiring fewer attributes than the second topographic classification lower down the hierarchy, and to associate topographical features in the remotely sensed data of the first geographic area with the corresponding topographic semantic label in accordance with the at least first and second topographic classifications specified by the input topographic data of the first geographic area.

15. A system for processing images of a geographic area to identify topographic features therein, the system comprising:
  a) one or more processors; and
  b) at least one computer-readable storage medium, the computer readable storage medium storing one or more computer programs so arranged such that when executed by the one or more processors they cause the one or more processors to perform a method for processing remotely sensed data pertaining to the topography of a geographic area to identify topographic characteristics thereof, the method comprising:
  i) receiving remotely sensed data pertaining to the topography of a geographic area;
  ii) inputting the remotely sensed data into a trained machine learning system;
  iii) recognising, using the machine learning system, topographic features within the data and semantically labelling the recognised features according to a pre-defined semantic labelling convention; and
  iv) generating topographic data corresponding to the recognised features for storage in a topographic database relating to the geographic area,
  wherein the recognising comprises recognising topographic features in the data to be a member of at least a first topographic classification and a second topographic classification arranged in accordance with a semantic topographic hierarchy, wherein the semantic topographic hierarchy is arranged with reference to attributes of the topographic features, the at least first and second topographic classifications specifying a number of attributes a topographic feature must have been determined to possess to be a member of the at least first and second topographic classifications, the first topographic classification higher up the hierarchy requiring fewer attributes than the second topographic classification lower down the hierarchy, the semantic labelling comprising labelling the recognised features in accordance with the at least first and second topographic classifications.

16. A method according to claim 1, wherein the first topographic classification is a building, and the second topographic classification is a category of building.

17. A method according to claim 1, wherein the topographical features are additionally recognised to be a member of a third topographic classification in the semantic topographic hierarchy, wherein the third topographic classification requires more attributes and is lower down the hierarchy than the second topographic classification.

18. A method according to claim 5, wherein the first topographic classification is a building, and the second topographic classification is a category of building.

19. A method according to claim 5, wherein the topographical features are additionally recognised to be a member of a third topographic classification in the semantic topographic hierarchy, wherein the third topographic classification requires more attributes and is lower down the hierarchy than the second topographic classification.

20. A method according to claim 14, wherein the first topographic classification is a building, and the second topographic classification is a category of building.

21. A method according to claim 14, wherein the topographical features are additionally recognised to be a member of a third topographic classification in the semantic topographic hierarchy, wherein the third topographic classification requires more attributes and is lower down the hierarchy than the second topographic classification.

22. A method according to claim 15, wherein the first topographic classification is a building, and the second topographic classification is a category of building.

23. A method according to claim 15, wherein the topographical features are additionally recognised to be a member of a third topographic classification in the semantic topographic hierarchy, wherein the third topographic classification requires more attributes and is lower down the hierarchy than the second topographic classification.

* * * * *